United States Patent

Potrafke

[15] 3,690,411
[45] Sept. 12, 1972

[54] DEVICE FOR SELF-SERVICE STORES

[72] Inventor: Werner Potrafke, Hufersenstr. 6, 432 Hattingen, Germany

[22] Filed: Dec. 10, 1970

[21] Appl. No.: 96,898

[30] Foreign Application Priority Data

Dec. 12, 1969 Germany..........P 19 62 319.9

[52] U.S. Cl. ..................................186/1 A, 209/125
[51] Int. Cl. ..............................................E04h 3/04
[58] Field of Search....186/1 A, 1.1, 1; 209/123, 122, 209/125

[56] References Cited

UNITED STATES PATENTS 2,625,241   1/1953   Smith..........................186/1 A
2,060,153   11/1936  Whipple....................209/125
3,147,845   9/1964   Harrison et al. ........209/125 X

FOREIGN PATENTS OR APPLICATIONS 289,884   6/1965   Netherlands...............186/1 A Primary Examiner—Evon C. Blunk
Assistant Examiner—Merle F. Maffei
Attorney—Walter Becker

[57] ABSTRACT

An arrangement for self-service stores, especially for use in connection with shopping baskets and shopping carts, in which goods selected by a customer for purchase are checked out by a cashier and conveyed to one of preferably three withdrawal compartments through the intervention of either endless conveyor belt and an inclined slide table or through the latter only, depending on which withdrawal compartment is selected by the cashier for receiving the goods purchased by the customer.

2 Claims, 10 Drawing Figures

PATENTED SEP 12 1972

INVENTOR
Werner Potrafke
By
Walter Becker

PATENTED SEP 12 1972 3,690,411
SHEET 3 OF 3
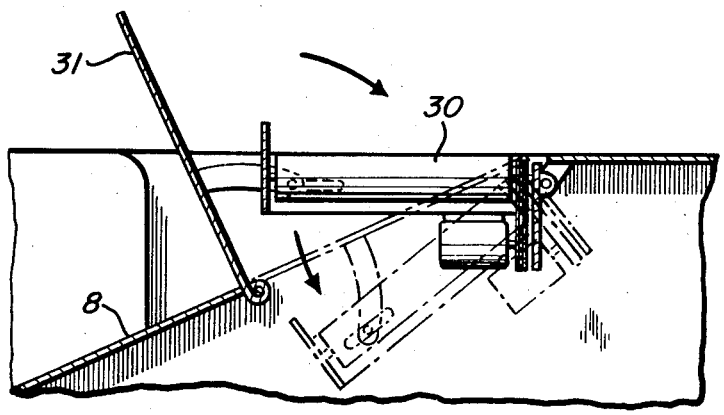
FIG-5
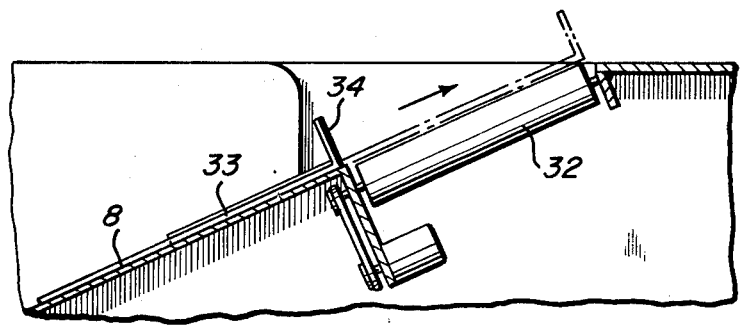
FIG-6
FIG-7
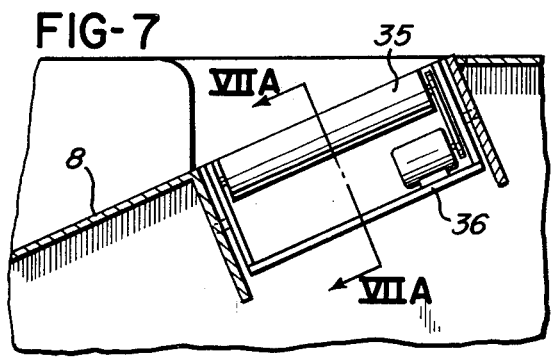
FIG-7A
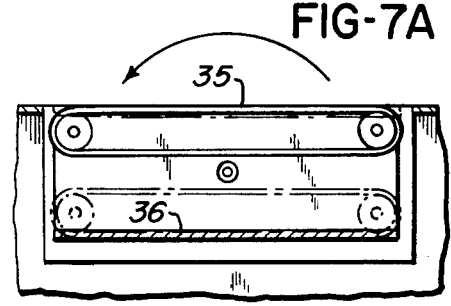
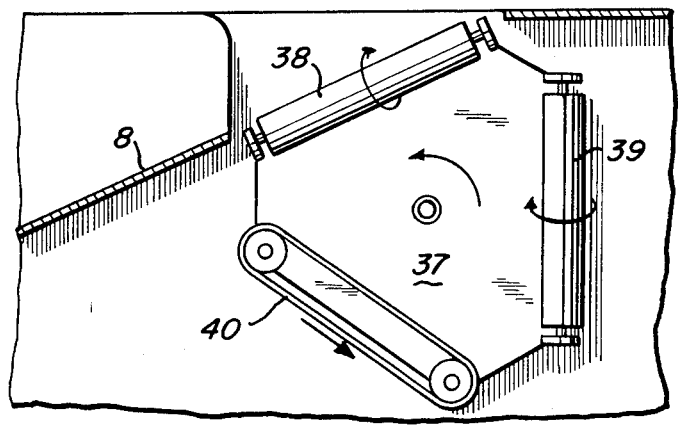
FIG-8
INVENTOR
Werner Potrafke
By
Walter Becker

DEVICE FOR SELF-SERVICE STORES

The present invention relates to a device for self-service stores for use in connection with shopping baskets or shopping carts, which device comprises primarily a cashier's stand, a depositing station for the filled shopping baskets or a registering plate for an intermediate depositing of the goods when employing shopping carts, and preferably three withdrawal compartments for the withdrawal of the checked out goods.

Cashier counters or devices for self-service stores have been known in various designs for a long time. Such devices are normally equipped with two or three withdrawal compartments. As experience has shown and as ascertained by tests and checks, cashier counters with three withdrawal compartments are with regard to the personnel required more economical than a cashier counter with two withdrawal compartments. For a fast handling of a long line of customers, especially during peak shopping hours as they occur over the week end, cashier counters with three withdrawal compartments are a must. It is, therefore, the tendency in self-service stores to reduce the number of cashier counters and to increase the economy of each individual cashier counter.

A modern cashier counter is expected to have as large withdrawal compartments as possible so that a single withdrawal compartment will be able to receive the greater assortment of goods bought during week end shopping. An increase in the surface of the withdrawal compartments runs counter to the second important requirement, namely to reduce the space required for the cashier counter as far as possible in order to save store surface. The simultaneous realization of these partly contradictory requirements represents a rather difficult problem. With heretofore known cashier counters having three withdrawal compartments, the just mentioned requirements are hardly or only insufficiently met.

Considering the above referred to requirements, it is furthermore necessary in connection with cashier counters to take into consideration the physical stress to which the cashier is subjected, especially when long waiting lines are involved. Also in this respect many of the heretofore known cashier counters are unsatisfactory. In spite of the employment of mechanical conveying means, such as conveyor belts, or the like, with some types of cashier counters relatively long conveying paths are present which have to be bridged by a manual action of the cashier.

According to a heretofore known suggestion for a device for self-service stores the distance between the area where the goods are picked up by the cashier during the checking-out and the three withdrawal compartments has been reduced to a minimum as compared with older types of cashier counters. The withdrawal of the goods by the cashier which, when employing shopping baskets, takes place at the depositing area of the filled shopping baskets and which, when using shopping carts, takes place at a registering plate located at the end of a conveyor belt, is with this design provided directly in front of an inclined surface which merges with the withdrawal compartments. More specifically, the withdrawal of the goods is in this instance effected in the center of the device, i.e., in front of the central withdrawal compartment.

It is, therefore, an object of the present invention with a device for self-service stores of the above mentioned type to improve the transfer or movement of the checked-out goods to the individual withdrawal compartments.

It is another object of this invention so to improve the transfer or movement of the checked-out goods that not only will the cashier be further relieved but the improvement will also contribute to a simplification of the structural features of the device. This improvement is to be such that additionally the withdrawal compartments are further enlarged while the total surface of the device substantially remains the same.

These and other objects and advantages of the invention will appear more clearly from the following specification in connection with the accompanying drawings, in which:

FIG. 1 diagrammatically illustrates a top view of a device according to the invention for self-service stores for use in connection with shopping carts.

Figure 3:
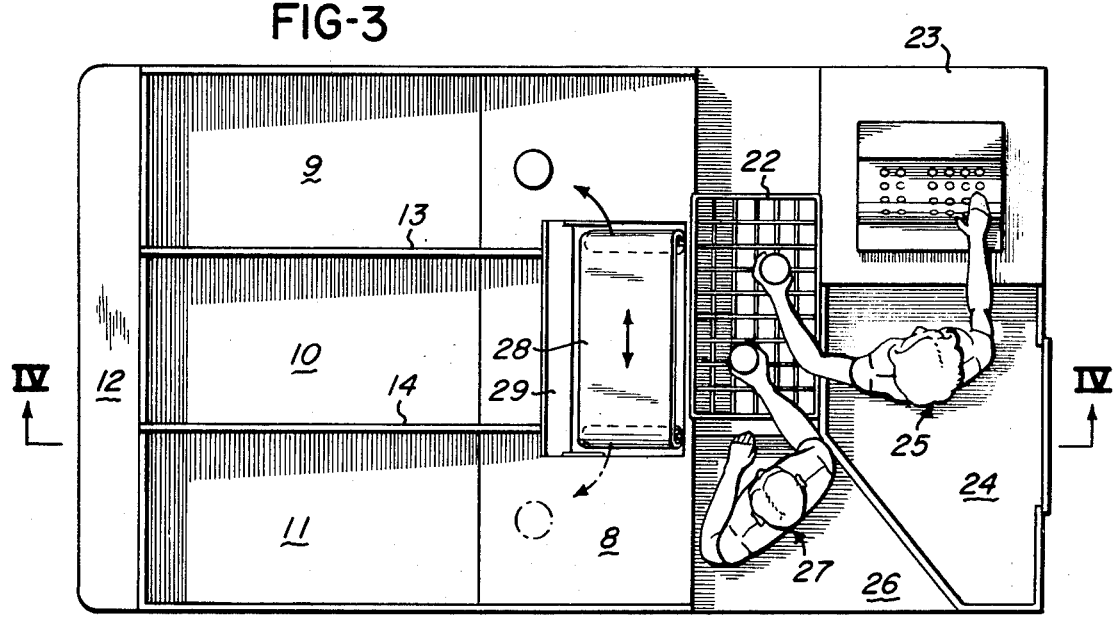

FIG. 3 diagrammatically illustrates in top view a device for self-service stores according to the invention employing shopping baskets.

Figure 4:
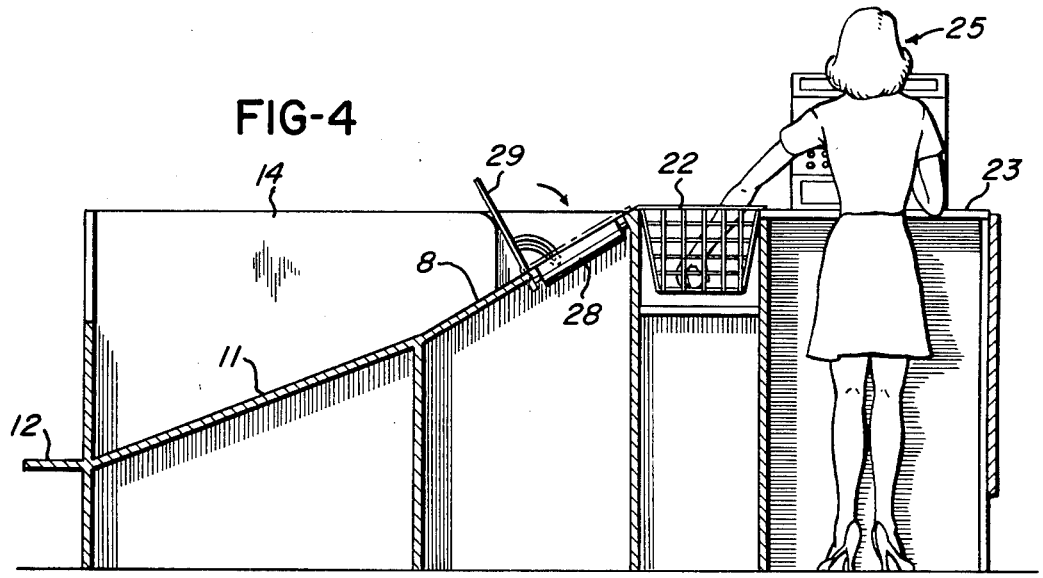

FIG. 4 is a section taken along the line IV—IV of FIG. 3.

FIGS. 5 to 8 represent side views or sections of the central portion of the device for different arrangements and designs of conveyor belts, FIG. 7a being a section along the line VIIa—VIIa of FIG. 7.

The device according to present invention, according to which in front of the withdrawal compartments there is provided an inclined surface extending over the entire width of said compartments, is characterized primarily in that at the upper end of the inclined surface there is provided an endless conveyor belt which has a length corresponding approximately to the width of the intermediate withdrawal compartment. This endless conveyor belt is provided with a conveying device extending in a direction transverse to the longitudinal axis of the device. This endless conveyor belt is either laterally displaceable above the inclined surface or in the vicinity of the plane of the inclined surface is located in front of the intermediate withdrawal compartment and is adapted by means of a plate serving as chute to be covered or is journalled on a pivot mounting which is connected to a slide which, after the turning of the pivot mounting, takes the place of the conveyor belt, or there is connected thereto a further conveyor belt with a different conveying direction.

According to a further feature of the invention, the conveyor belt occupies a horizontal position and by means of supporting rollers is guided on rails while that side which faces the withdrawal compartments may be provided with a border or limit strip confining the conveyor belt. The transmission means, for instance in the form of a chain or a belt drive, is according to a further feature of the invention guided by a motor located below the inclined surface through a slot to one of the two shafts of the conveyor belt. Motor, transmission and conveyor belt expediently form a single structural unit which may be displaced as a unit. Instead of a motor located below the inclined surface, it is also possible to employ a motor located within the conveyor belt.

The control devices for the drive motor of the conveyor belt are expediently so arranged and designed that in response to a short advancing movement of the conveyor belt a conveying movement of the belt in conformity with said advancing movement is initiated. When the conveyor belt is located in front of the outer withdrawal compartment, in which instance the drive may be disengaged, it is suggested according to a further feature of the invention to provide a limit switch interrupting the motor circuit.

In view of the displaceable conveyor belt according to the invention only a portion of the horizontal length of the inclined surface in front of the withdrawal compartments is being used so that that portion which remains free can be used for extending the confining walls between the central and the respective outer withdrawal compartment. The volume of the withdrawal compartments will in this way be correspondingly enlarged. The handling of the conveyor belt is extremely simple. The path of the goods from the shopping basket or from the registering plate up to the conveyor belt or to the inclined surface (when loading the central withdrawal compartment) has with this device reached a minimum value which cannot be reduced further. When a registering plate is employed, the goods can be pushed toward the side by a mere manual move.

When with a lesser number of customers, two withdrawal compartments suffice, the conveyor belt may remain in the position in front of the central withdrawal compartment and has to be shifted only with regard to its conveying direction. The conveyor belt is generally so designed in connection with the driving motor that it can be easily exchanged if necessary.

For conveying the goods into the withdrawal compartments by means of a conveyor belt, also other modifications are possible. Thus, according to a further feature of the invention, at the start of the inclined surface and in front of the intermediate withdrawal compartment there may be provided a transverse conveyor belt which is not displaceable. The conveyor belt is adapted either to be covered by a plate serving as chute when the intermediate or central withdrawal compartment is being loaded or it may be arranged on a rotatably mounted pivot mounting and by turning the pivot mounting may either be exchanged and replaced by a conveyor belt with different transporting direction or it may be replaced by a plate serving as chute.

With a stationary arrangement of the conveyor belt, the slide may be pivotally journalled at that side of the conveyor belt which is the lower side with regard to the inclination of the inclined surface and may be foldable upwardly into a position in which it is substantially perpendicular to the inclined surface. The conveyor belt, however, may also occupy a horizontal working position and at the same time may be pivotable, in response to the downward folding of the slide, into the plane of the inclined surface.

Instead of an inclined surface or slide, also a plate displaceable parallel to the plane of the inclined surface may be provided.

With the above mentioned design, the transporting direction of the conveyor belt is, when loading the two outer withdrawal compartments, reversed, while when the central withdrawal compartment is being filled, the conveyor belt is covered by a plate serving as slide.

Conveyor belt and slide may also be arranged on opposite sides of a rotatably journalled frame so that, depending on the requirements, the conveyor belt or the slide is tilted upwardly.

Finally, a further embodiment is possible according to which the pivot mounting has the shape of a prism. On two sides of the prism the pivot mounting carries a conveyor belt operable in opposite directions, whereas on the third side there is provided a slide or a conveyor belt movable in the direction toward the central withdraw compartment.

Referring now to the drawings in detail, the device shown therein has rectangular basic dimensions and comprises a cash register stand 1, a space 2 for the cashier 3, a conveyor belt 4 with a registering plate 5 adjacent thereto, a space 6 for a helper 7, and adjacent to an inclined surface 8 three withdrawal compartments 9, 10 and 11 arranged adjacent to each other. In front of the withdrawal compartments there is provided a board 12 for depositing a shopping bag. The withdrawal compartments are separated from each other by partitions 13, 14.

At the start of the inclined surface 8 there is provided a conveyor belt 15a which is displaceable from a position in front of the central withdrawal compartment 10 to a position in front of the withdrawal compartment 9. The conveyor system 15 includes supporting rollers 16, 17 by means of which the conveyor belt is guided over rails 18, 19, or the like. The drive of the conveyor 15 is effected by means of a motor 20 which is located below the inclined surface 8 and through the intervention of a chain drive 21 is drivingly connected to a shaft of the conveyor system.

Figure 1:
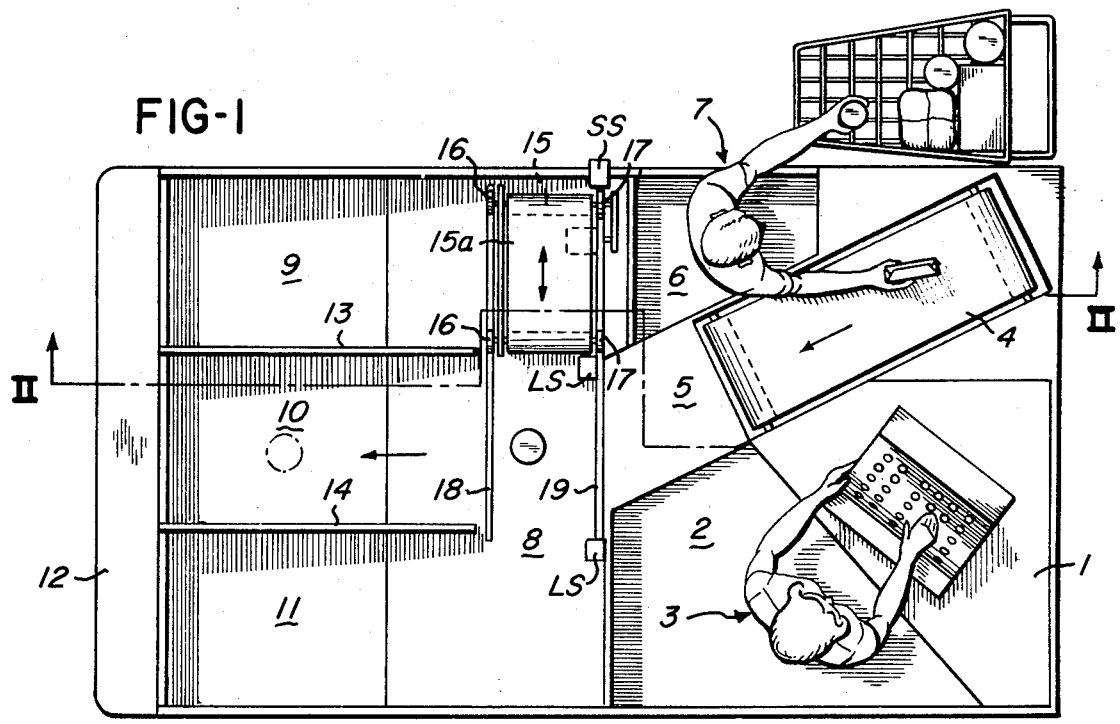

The device operates as follows. When loading the outer withdrawal compartments 9 and II, the conveyor belt 15a occupies the position in front of the central withdrawal compartment 10. The goods to be checked are (via conveyor belt 4 moved to the registering or check-out plate 5 from where they are by the cashier, while simultaneously being checked and registered in the cash register) conveyed to the conveyor belt 15a. Depending on the transporting direction of the conveyor system 15a, the goods pass to the withdrawal compartment 9 or to the withdrawal compartment 11. The adjustment of the desired conveying direction may be effected by means of electric limit switches which are adapted to be actuated by a short jerky movement of the conveyor belt 15a to one or the other side. If it is desired to load the central withdrawal compartment 10, the conveyor belt 15a is moved into the position shown in FIG. 1 while by means of a limit switch the circuit for motor 20 can be interrupted.

Figure 2:
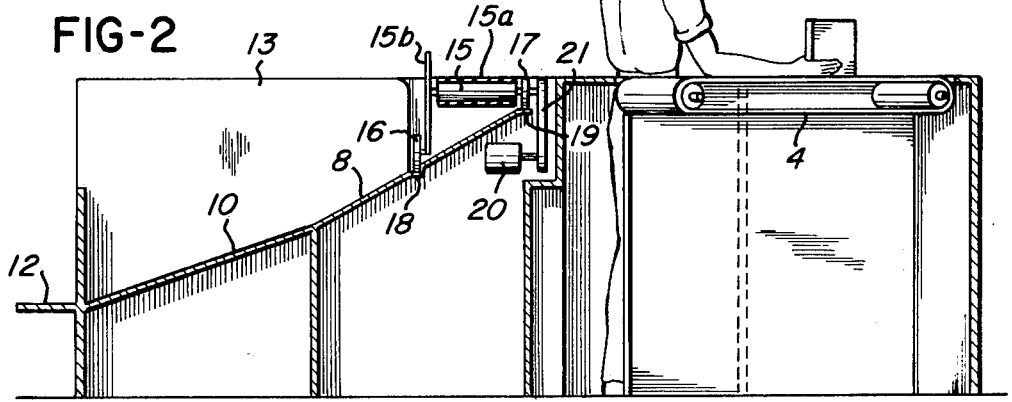
FIG. 2 is a side view of the upper portion of the device of FIG. 1 as viewed along the section line II—II of FIG. 1.
Figure 2A:
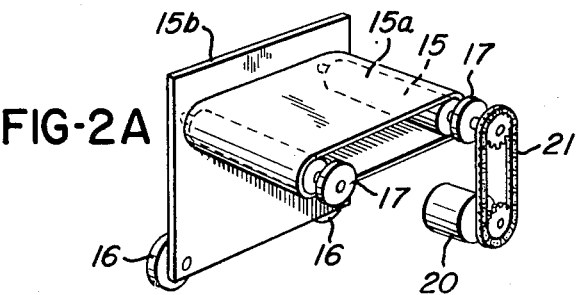
FIG. 2a shows the upper central portion of FIG. 2 on a somewhat larger scale and as an isometric view.

The device illustrated in FIGS. 3 and 4 is designed for the employment of shopping baskets 22. A conveyor belt is not needed with this device. The cash register stand 23 is with this design arranged perpendicularly with regard to the direction of movement of the customers. Adjacent the space 24 for the cashier 25 there is again provided a space 26 for a helper 27. The design of the withdrawal compartments is the same as with the embodiment of FIGS. 1 and 2. Therefore, these elements have been designated with the same reference numerals as in FIGS. 1 and 2.

At the start of the inclined surface 8, this embodiment comprises a conveyor belt 28 which is located in the plane of the inclined surface and which is not displaceable as to its location. This conveyor belt may be covered by a plate 29 forming a slide or chute. The operation of the device according to FIGS. 3 and 4 is as follows:

When it is desired to load the two outer withdrawal compartments 9, 11, the plate 29 is folded upwardly. The cashier withdraws the goods from the shopping basket and places the same onto the adjacent conveyor belt 28. By means of a food-operable switch or the like the desired conveying direction of the conveyor may be selected. If, however, it is desired to load the intermediate withdrawal compartment 10, it is merely necessary to fold plate 29 downwardly. The surface of plate 29, preferably made of metal, serves as slide or chute.

According to the embodiment of Fig. 5, the conveyor belt occupies a horizontal position. The conveyor belt 30 is journalled so that it can be pivoted within certain limits and so that with the folding of plate 31 in downward direction, the conveyor belt will be lifted into the plane of the inclined surface 8. Also in this instance plate 31, when in its folded down position, serves as slide or chute.

The embodiment of FIG. 6 differs from that of FIGS. 3 and 4 primarily in that for covering the conveyor belt 32 there is provided a displaceable plate 33 which at the upper side is additionally equipped with a rail 34.

According to the embodiment of FIG. 7, the conveyor belt 35 and the plate 36 are arranged in a rotatably journalled frame in such a way that selectively the conveyor belt 35 or plate 36 may be shifted into the upper position of use.

If a shift-over of the conveyor belt is to be avoided, a design according to FIG. 8 may be employed. According to this design, two conveyor belts 38, 39 designed in the form of a prism and extending transverse to the longitudinal axis of the device while moving in opposite directions are provided on a rotatably journalled frame 37. In addition thereto, there is provided a further conveyor belt 40 which as far as its conveying direction is concerned, is directed toward the central withdrawal compartment. The individual conveyor belts may circulate continuously so that for purposes of conveying the goods to one of the three withdrawal compartments, it is merely necessary to shift the desired conveyor belt to its position of use. The conveyor belt 40 may, however, also be replaced by a plate serving as slide or chute.

It is, of course, to be understood that the present invention is, by no means, limited to the particular constructions shown in the drawings but also comprises any modifications within the scope of the appended claims.

What I claim is:

1. An arrangement for self-service stores, especially for use in connection with shopping baskets and shopping carts, which includes: a cashier stand, a deposit station arranged within manual reach from said cashier stand for receiving goods selected by a customer for purchase, at least two withdrawal compartments arranged alongside each other and each having a loading opening at one end facing in the direction toward said cashier stand, slide table means interposed between said cashier stand on one hand and said withdrawal compartment on the other hand while being downwardly inclined from said cashier stand toward said withdrawal compartments for causing goods placed at the upper portion of the said slide table means to slide toward the respective adjacent withdrawal compartment at the lower side of said table means, and controllable endless conveyor belt means arranged adjacent said slide table means and movable relative thereto and relative to said withdrawal compartments for selectively conveying goods placed on said endless conveyor belt means to one of said withdrawal compartments, said endless conveyor belt means having a conveying direction transverse to said loading openings, cover plate means associated with said endless conveyor belt means and operable selectively at least approximately to be brought into alignment with the surface of said inclined slide table means while covering up said endless conveyor belt means.

2. An arrangement for self-service stores, especially for use in connection with shopping baskets and shopping carts, which includes: a cashier stand, a deposit station arranged within manual reach from said cashier stand for receiving goods selected by a customer for purchase, at least two withdrawal compartments arranged alongside each other and each having a loading opening at one end facing in the direction toward said cashier stand, slide table means interposed between said cashier stand on one hand and said withdrawal compartment on the other hand while being downwardly inclined from said cashier stand toward said withdrawal compartments for causing goods placed at the upper portion of the said slide table means to slide toward the respective adjacent withdrawal compartment at the lower side of said table means, and controllable endless conveyor belt means arranged adjacent said slide table means and movable relative thereto and relative to said withdrawal compartments for selectively conveying goods placed on said endless conveyor belt means to one of withdrawal with compartments, said endless conveyor belt means having a conveying direction transverse to said loading openings, said endless conveyor belt means having its surface inclined at approximately the same angle as said slide table means and including slide plate means associated with said endless conveyor belt means and operable selectively to be moved into a position in which it covers up said endless conveyor belt means while being at least approximately flush with the surface of said inclined slide table means.

* * * * *